(12) United States Patent
Guo et al.

(10) Patent No.: US 11,536,911 B2
(45) Date of Patent: Dec. 27, 2022

(54) FERRULE, OPTICAL CONNECTOR, OPTICAL COMMUNICATION ELEMENT, COMMUNICATIONS DEVICE, AND PREPARATION METHOD

(71) Applicant: HUAWEI TECHNOLOGIES CO., LTD., Guangdong (CN)

(72) Inventors: Dan Guo, Dongguan (CN); Baoqi Wang, Yokohama (JP); Junying Zhao, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/147,930

(22) Filed: Jan. 13, 2021

(65) Prior Publication Data
US 2021/0141165 A1    May 13, 2021

Related U.S. Application Data

(63) Continuation of application No. PCT/CN2020/099462, filed on Jun. 30, 2020.

(30) Foreign Application Priority Data

Nov. 8, 2019  (CN) .......................... 201911086437.0

(51) Int. Cl.
   *G02B 6/38*         (2006.01)
(52) U.S. Cl.
   CPC ......... *G02B 6/3845* (2013.01); *G02B 6/3818* (2013.01); *G02B 6/382* (2013.01); *G02B 6/3813* (2013.01)

(58) Field of Classification Search
   CPC .... G02B 6/3813; G02B 6/3818; G02B 6/382; G02B 6/3833; G02B 6/3845
   See application file for complete search history.

(56) References Cited

U.S. PATENT DOCUMENTS 9,110,246 B2 *  8/2015  Berishev ................. G02B 6/32
10,598,866 B2 *  3/2020  Xu ....................... G02B 6/3863
(Continued)

FOREIGN PATENT DOCUMENTS

CN        1955770 A     5/2007
CN      101178464 A     5/2008
(Continued)

*Primary Examiner* — Daniel Petkovsek
(74) *Attorney, Agent, or Firm* — Womble Bond Dickinson (US) LLP

(57) ABSTRACT

A ferrule includes a ferrule matrix, an optical fiber, and a dielectric reflective film. The optical fiber is disposed in an accommodating through hole of the ferrule matrix, and the dielectric reflective film covers an optical transmission surface of the optical fiber and a surface that is of the ferrule matrix and that faces a matching ferrule. The dielectric reflective film has a through hole, such that the dielectric reflective film does not shield a main optical path area of the optical transmission surface of the optical fiber. A reflective band of the dielectric reflective film includes at least a part of a communication band of the optical fiber. In this way, when light from the matching ferrule is transmitted to the ferrule matrix and the optical fiber, the dielectric reflective film reflects the light.

20 Claims, 12 Drawing Sheets

(56) References Cited

U.S. PATENT DOCUMENTS

| | | | |
|---|---|---|---|
| 2007/0092184 A1* | 4/2007 | Hama | G02B 6/4298 |
| | | | 385/76 |
| 2011/0103746 A1* | 5/2011 | Shacklette | G02B 6/382 |
| | | | 385/60 |
| 2012/0026749 A1 | 2/2012 | Armstrong | |
| 2013/0163930 A1* | 6/2013 | Jian | G02B 6/36 |
| | | | 385/60 |
| 2018/0039023 A1 | 2/2018 | Lee et al. | |
| 2018/0335573 A1* | 11/2018 | Wada | G02B 6/3882 |
| 2019/0199051 A1 | 6/2019 | Herr et al. | |

FOREIGN PATENT DOCUMENTS

| | | |
|---|---|---|
| CN | 101183163 A | 5/2008 |
| CN | 101539666 A | 9/2009 |
| CN | 101788700 A | 7/2010 |
| CN | 101933202 A | 12/2010 |
| CN | 102597830 A | 7/2012 |
| CN | 202975393 U | 6/2013 |
| CN | 203025388 U | 6/2013 |
| CN | 203054268 U | 7/2013 |
| CN | 104220912 A | 12/2014 |
| CN | 207268795 U | 4/2018 |
| CN | 108490550 A | 9/2018 |
| CN | 109633824 A | 4/2019 |
| EP | 1780564 A2 | 5/2007 |
| JP | S597312 A | 1/1984 |

* cited by examiner

FERRULE, OPTICAL CONNECTOR, OPTICAL COMMUNICATION ELEMENT, COMMUNICATIONS DEVICE, AND PREPARATION METHOD

CROSS-REFERENCE TO RELATED APPLICATIONS

This application is a continuation of International Application No. PCT/CN2020/099462, filed on Jun. 30, 2020, which claims priority to Chinese Patent Application No. 201911086437.0, filed on Nov. 8, 2019. The disclosures of the aforementioned applications are hereby incorporated by reference in their entireties.

TECHNICAL FIELD

This application relates to the field of communications technologies, and in particular, to a ferrule, an optical connector, an optical communication element, a communications device, and a preparation method.

BACKGROUND

In a big data era, optical communication is widely used for transmitting massive data. However, an energy density of an optical transmission medium (for example, a single-mode fiber or a waveguide) is very high due to a rapid increase of data transmission amount. The optical transmission medium is a part of a ferrule of a connector and is disposed in a ferrule matrix. By connecting ferrules of two connectors, optical communication is achieved using optical transmission mediums in the two ferrules. Light from an optical transmission medium of one ferrule is transmitted to a surface of a ferrule matrix of the other ferrule. The light is absorbed by the surface and converted to heat. When heat accumulates, the ferrule matrix of the other ferrule is burnt down.

SUMMARY

This application provides a ferrule, an optical connector, an optical communication element, a communications device, and a preparation method, to reduce a probability of burning down of a ferrule matrix or an optical transmission medium in the ferrule. This ensures stability of data transmission in an optical communication system.

According to a first aspect, a ferrule is provided. The ferrule may be applied to an optical connector such as an optical fiber connector or an optical waveguide connector, and is used in combination with a matching ferrule of another optical connector. In this way, optical communication is implemented between two optical connectors. The ferrule provided in this application includes a ferrule matrix, an optical transmission medium, and a reflective film. The ferrule matrix includes a first surface, where the first surface faces a corresponding matching ferrule when the ferrule matches the matching ferrule. The ferrule matrix includes an accommodating through hole, and one end of the accommodating through hole is located on the first surface of the ferrule matrix. The optical transmission medium is disposed in the accommodating through hole. The optical transmission medium includes a second surface, where the second surface faces the corresponding matching ferrule of the ferrule when the ferrule matches the matching ferrule. The second surface is an optical transmission surface. The reflective film covers the first surface of the ferrule matrix, and a reflective band of the reflective film includes at least a part of a communication band of the optical transmission medium. When the ferrule is used in combination with the matching ferrule, light transmitted from the matching ferrule to the first surface is reflected to another direction by the reflective film on the first surface. This mitigates conversion of the light into heat on the first surface of the ferrule matrix. This reduces a probability of burning down of the ferrule matrix.

In addition, the second surface of the optical transmission medium may be easily tainted with an impurity such as dust. Therefore, when the light from the matching ferrule is transmitted to the second surface, the light is converted to heat, and the impurity on the second surface may burn due to the heat. This causes burning down of the optical transmission medium. In view of this, in a specific implementation, the reflective film also covers a part of the second surface. The reflective film has a through hole. An orthographic projection of the through hole onto the second surface covers an optical core area of the second surface. In this way, the reflective film can reflect the light transmitted from the matching ferrule to the second surface to another direction. Therefore, heat converted from remaining light is insufficient to enable the impurity on the second surface to reach an ignition point and burn. This reduces the probability of burning down of the optical transmission medium. The through hole disposed on the reflective film can prevent the reflective film from shielding an optical fiber that extends out of the optical core area. In addition, this prevents the matching ferrule from scratching a bottom surface of a groove structure surrounded by a side wall of the through hole. Therefore, a loss rate of an optical signal is reduced. Particularly, when a thickness of the reflective film is greater than or equal to 1.0 micro-meter (μm) and less than or equal to 3.0 μm, the bottom surface of the groove structure surrounded by the side wall of the through hole cannot be easily scratched, and dust in the through hole is easy to remove.

In an embodiment, the second surface has a main optical path area. To ensure that all of the light transmitted from the matching ferrule can enter the optical transmission medium in the ferrule and to reduce a signal loss rate, the orthographic projection of the through hole onto the second surface covers the main optical path area.

To reduce difficulties in a production process and facilitate mass production, in a specific implementation, for example, the optical transmission medium is a single-mode fiber. In this case, a gap between an edge of the orthographic projection of the through hole onto the second surface and an edge of the main optical path area is greater than or equal to 12.5 μm and less than or equal to 42.5 μm.

When the ferrule in this application is used in combination with the matching ferrule, the reflective film and the through hole in the ferrule cause a height difference between a surface of the reflective film and the bottom surface of the groove structure surrounded by the side wall of the through hole. In this case, air exists in the through hole, and Fresnel reflection is easily caused. In view of this, in a specific implementation, the ferrule further includes an anti-reflective film located on one side that is of the optical transmission medium and that faces the matching ferrule. An orthographic projection of the anti-reflective film onto the second surface covers the orthographic projection of the through hole onto the second surface, and an anti-reflective band of the anti-reflective film includes at least a part of a communication band of the optical transmission medium. In this case, the anti-reflective film is used to reduce the Fresnel reflection.

The anti-reflective film may be disposed in a plurality of manners. For example, in a specific implementation, the anti-reflective film is located between the reflective film and the optical transmission medium. In another specific implementation, the anti-reflective film is formed in the through hole of the reflective film. To prevent a surface of the anti-reflective film from being scratched, in specific implementation, a surface that is of the anti-reflective film and that faces the matching ferrule is recessed from a surface that is of the reflective film and that faces the matching ferrule. For example, a height difference between the surface that is of the anti-reflective film and that faces the matching ferrule and the surface that is of the reflective film and that faces the matching ferrule is greater than or equal to 0.8 μm and less than or equal to 2.8 μm.

In an embodiment, a reflectivity of the anti-reflective film for an optical wave within the anti-reflective band is less than or equal to 0.25%, to ensure that a loss rate of optical signal transmission meets a standard. More specifically, the reflectivity of the anti-reflective film for the optical wave within the anti-reflective band is less than or equal to 0.1%.

To prevent a filler from being burnt down, in a specific implementation, a reflectivity of the reflective film for an optical wave within the reflective band is greater than or equal to 80%.

To further prevent a surface (the first surface or the second surface) that is of the ferrule and that faces the matching ferrule from being burnt down, a temperature resistant film is disposed on an inner surface of the reflective film.

A filler is disposed in a gap between an inner wall of the accommodating through hole and a circumferential side surface of the optical transmission medium. In an embodiment, the reflective film is disposed on one side that is of the filler and that faces the matching ferrule and is opposite to the filler, to prevent the filler from being burnt down.

In a specific implementation, an orthographic projection of the reflective film onto a reference plane covers an orthographic projection of the filler onto the reference plane, and the reference plane is vertical to an axial direction of the accommodating through hole.

In specific disposition, the reflective film may be disposed in a plurality of manners based on a manner in which the optical transmission medium matches the ferrule, provided that the reflective film can block light originally transmitted to the filler and reflect the light. In an embodiment, the second surface protrudes from the first surface, and the reflective film covers the circumferential side surface of the optical transmission medium. In another specific implementation, the second surface is recessed from the first surface, and the reflective film covers the inner wall of the accommodating through hole. In another specific implementation, the second surface is aligned with the first surface, and the reflective film covers the gap between the inner wall of the accommodating through hole and the circumferential side surface of the optical transmission medium.

According to a second aspect, this application further provides a connector. The connector may be an optical connector such as an optical fiber connector or an optical waveguide connector. The connector includes a housing and the ferrule provided in the foregoing technical solution. The ferrule is disposed in the housing. The ferrule is used in combination with a matching ferrule of another connector, such that an optical signal can be transmitted between the two connectors. The ferrule provided in the foregoing technical solution is used to mitigate conversion of light that comes from the matching ferrule into heat on the first surface of the ferrule matrix. This reduces a probability of burning down of the ferrule matrix.

According to a third aspect, this application provides an optical communication element. The optical communication element includes the ferrule provided in the foregoing technical solution and an optical communication element body. The ferrule is connected to the optical communication element body. The optical communication element body may be an optical backplane, an optical fiber bundle backplane, a co-packaged module, or a wavelength selective switch (WSS) module. The ferrule provided in the foregoing technical solution is used to mitigate conversion of light that comes from the matching ferrule into heat on the first surface of the ferrule matrix. This reduces a probability of burning down of the ferrule matrix.

According to a fourth aspect, this application further provides a communications device. For example, the communications device may be a router, a switch, or the like. The communications device includes a matching optical communication element and the optical communication element provided in the foregoing technical solution. The matching optical communication element includes a matching ferrule. The ferrule of the optical communication element is connected to the matching ferrule of the matching optical communication element. The optical communication element includes the ferrule provided in the foregoing technical solution. Therefore, when the ferrule of the optical communication element is connected to the matching ferrule of the matching optical communication element, conversion of light that comes from the matching ferrule into heat on the first surface of the ferrule matrix can be mitigated. This reduces a probability of burning down of the ferrule matrix.

When the ferrule of the optical communication element matches the matching ferrule of the matching optical communication element, a gap between a bottom surface of a groove surrounded by a side wall of a through hole in the ferrule and a light-exiting surface of the matching ferrule cannot be excessively large. If the gap is excessively large, a high loss of an optical signal is easily caused. In a specific implementation, the gap is less than or equal to 5 μm.

According to a fifth aspect, this application further provides a method for preparing a ferrule. The ferrule includes a ferrule matrix and an optical transmission medium. The ferrule matrix includes an accommodating through hole, and one end of the accommodating through hole is located on a first surface. When the ferrule matches a matching ferrule, the first surface faces the matching ferrule. The optical transmission medium is disposed in the accommodating through hole. The optical transmission medium has a second surface. When the ferrule matches a matching ferrule, the second surface faces the matching ferrule. The second surface is an optical transmission surface. A filler is disposed in a gap between an inner wall of the accommodating through hole and a circumferential side surface of the optical transmission medium. The filler is used to secure the inner wall of the accommodating through hole and the corresponding surface of the optical transmission medium. The method for preparing the ferrule includes:

forming a reflective film on one side that is of the ferrule matrix and that faces the matching ferrule, where the reflective film covers the first surface, and a reflective band of the reflective film includes at least a part of a communication band of the optical transmission medium. Light transmitted from the matching ferrule to the first surface is reflected to another direction by the reflective film on the first surface.

This mitigates conversion of the light into heat on the first surface of the ferrule matrix, thereby reducing a probability of burning down of the ferrule matrix.

In an embodiment, the formed reflective film also covers a part of the second surface of the optical transmission medium, and the reflective film has a through hole. An orthographic projection of the through hole onto the second surface covers an optical core area of the second surface. In this way, the reflective film can reflect the light transmitted from the matching ferrule to the second surface to another direction. This reduces a probability of burning down of the ferrule matrix.

In an embodiment, the second surface has a main optical path area. To ensure that all of the light transmitted from the matching ferrule can enter the optical transmission medium in the ferrule and to reduce a signal loss rate, the orthographic projection of the through hole onto the second surface of the formed reflective film covers the main optical path area.

Various manners can be used to form the reflective film on one side that is of the ferrule matrix and that faces the matching ferrule. In a specific implementation, a sacrificial layer is first formed on one side that is of the optical transmission medium and that faces the matching ferrule. Then, the reflective film is formed on the side that is of the optical transmission medium and that faces the matching ferrule, where the reflective film covers the sacrificial layer and the second surface. Subsequently, the sacrificial layer and the film on a surface of the sacrificial layer are removed to form the through hole. Alternatively, in another specific implementation, the reflective film is first formed on one side that is of the optical transmission medium and that faces the matching ferrule. Then, the reflective film is patterned to form the through hole on the reflective film.

To reduce Fresnel reflection caused by direct contact between a bottom surface of a groove structure surrounded by a side wall of the through hole and air in the through hole, in a specific implementation, the method for preparing the ferrule further includes forming the reflective film on the side that is of the ferrule matrix and that faces the matching ferrule. An orthographic projection of the anti-reflective film onto the second surface covers the orthographic projection of the through hole onto the second surface. An anti-reflective band of the anti-reflective film includes at least a part of the communication band of the optical transmission medium. In this case, the anti-reflective film is used to reduce the Fresnel reflection.

The anti-reflective film may be formed in a plurality of manners. For example, in a specific implementation, before the reflective film is formed on the side that is of the ferrule matrix and that faces the matching ferrule, the anti-reflective film is first formed on the side that is of the optical transmission medium and that faces the matching ferrule. Alternatively, in another specific implementation, after the reflective film is formed on the side that is of the ferrule matrix and that faces the matching ferrule, the anti-reflective film is formed in the through hole.

In another embodiment, the filler is disposed in the gap between the inner wall of the accommodating through hole and the circumferential side surface of the optical transmission medium. To reduce the probability of burning down of the filler, the reflective film is disposed on one side that is of the filler and that faces the matching ferrule, and the filler is opposite to the reflective film.

In specific disposition, to ensure that the filler is entirely shielded by the reflective film to prevent the filler from being directly exposed to light, in an embodiment, an orthographic projection of the reflective film onto a reference plane covers an orthographic projection of the filler onto the reference plane. The reference plane is vertical to an axial direction of the accommodating through hole.

To further prevent the surface that is of the ferrule and that faces the matching ferrule from being burnt down, in a specific implementation, before the reflective film is formed, a temperature resistant film is first formed on the side that is of the ferrule matrix and that faces the matching ferrule.

BRIEF DESCRIPTION OF DRAWINGS

FIG. 9b is a partially enlarged view of a portion F in FIG. 9a;

DESCRIPTION OF EMBODIMENTS

To make the objectives, technical solutions, and advantages of this application clearer, the following further describes this application in detail with reference to the accompanying drawings.

Figure 1:
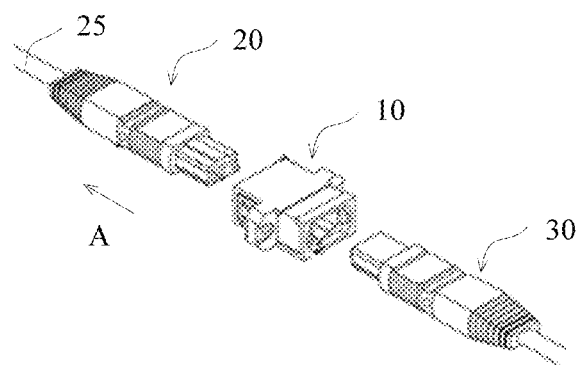
FIG. 1 is an example of an exploded view of matching between a pair of MPO connectors.
Figure 2:
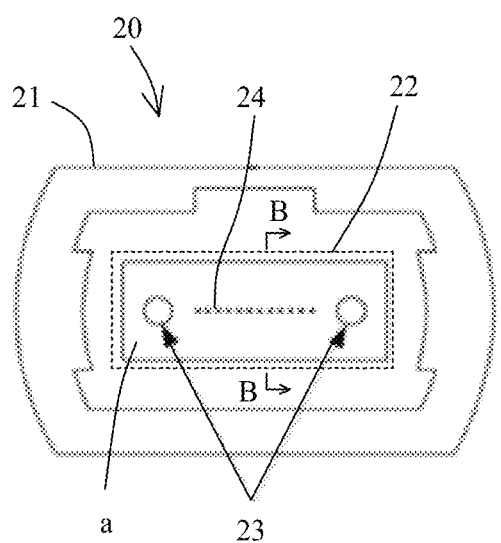
FIG. 2 is an enlarged view obtained by viewing a left MPO connector in FIG. 1 along a direction A.

To facilitate understanding of a ferrule provided in embodiments of this application, an application scenario of the ferrule is first described. FIG. 1 is an example of an exploded view of matching between a pair of Multi-fiber Pull Off (MPO) connectors. FIG. 2 is an enlarged view obtained by viewing a left MPO connector 20 in FIG. 1 along a direction A. With reference to FIG. 1 and FIG. 2, for example, the MPO connector 20 includes a housing 21. A ferrule 22 is located in the housing 21. An optical fiber ribbon 25 extends into the ferrule 22, and a pair of guide pins 23 are disposed on a front end face a of the ferrule 22. A plurality of optical fibers 24 in the optical fiber ribbon 25 extend to the front end face a of the ferrule 22. An MPO connector 30 has a structure similar to that of the MPO connector 20, except for that guide holes recessed from a front end face a are provided instead of the guide pins 23 on the front end face a, to match the guide pins 23 of the MPO connector 20 for positioning. A connection through hole is disposed in an adapter 10. During connection, the MPO connector 20 is inserted into the adapter 10 through one entrance of the connection through hole of the adapter 10, where the front end face a of the MPO connector 20 faces the entrance. The MPO connector 30 is inserted into the adapter 10 through the other entrance of the connection through hole of the adapter 10 from an opposite direction. The guide pins 23 of the MPO connector 20 are inserted into the guide holes of the MPO connector 30 for positioning. The optical fibers 24 on the front end face a of the ferrule 22 of the MPO connector 20 are disposed opposite to optical fibers on the front end face of a ferrule of the MPO connector 30 on a one-to-one basis, to transmit light. The ferrule provided in this embodiment of this application may be the ferrule 22 of the MPO connector 20 or the ferrule of the MPO connector 30. It should be noted that the ferrule provided in this embodiment of this application is not limited to the foregoing application scenario. Alternatively, the ferrule may be a ferrule of a multi-core optical connector such as an Optical Backplane Connector or an optical backplane connector (OB connector), an MT array connector, and an HBMT connector, a ferrule of a single-core optical fiber connector such as an Ferrule Connector (FC), an Latch Connector (LC), an Square Connector (SC), and an Spring Tension (ST) connector, a ferrule of an optical waveguide connector, a ferrule of an optical fiber array connector, or a ferrule of another Mechanical transfer connector (MT connector).

Figure 3:
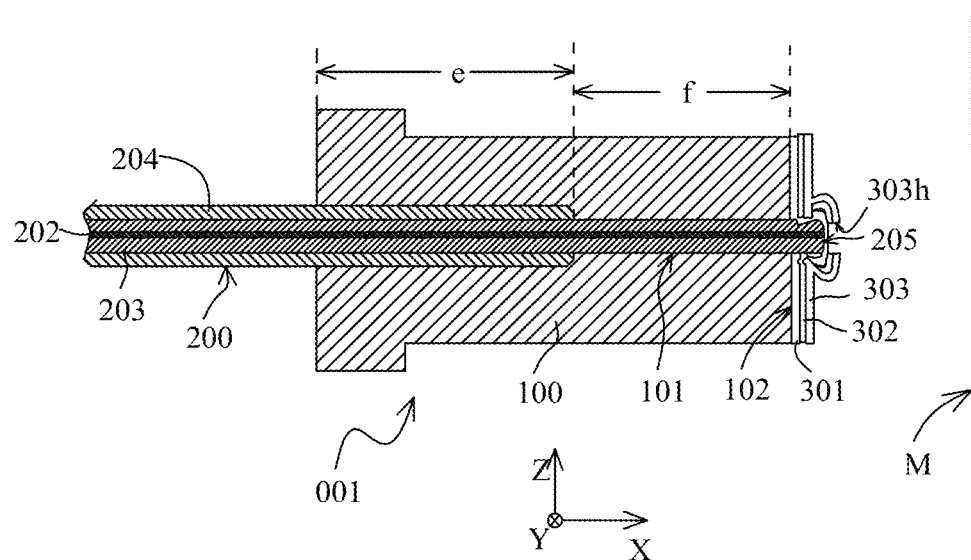
FIG. 3 is an example of a longitudinal section view of a ferrule according to an embodiment of this application.
Figure 4:
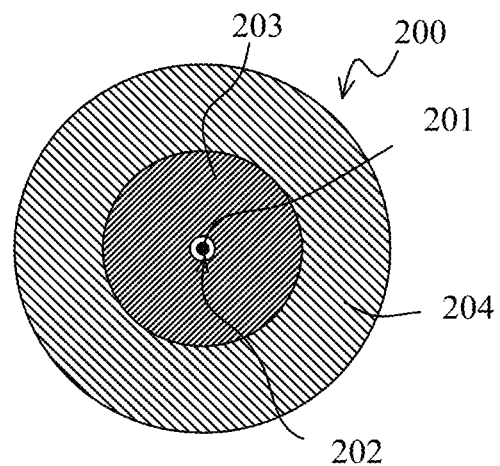
FIG. 4 is an example of an enlarged view of a cross section of an optical fiber in FIG. 3.
Figure 5:
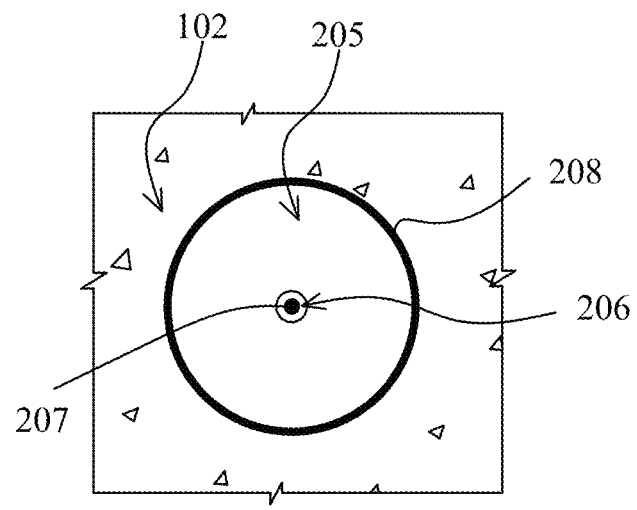
FIG. 5 is a schematic partial view obtained by viewing a ferrule matrix and an optical fiber in FIG. 3 along a negative X-axis direction.
Figure 6:
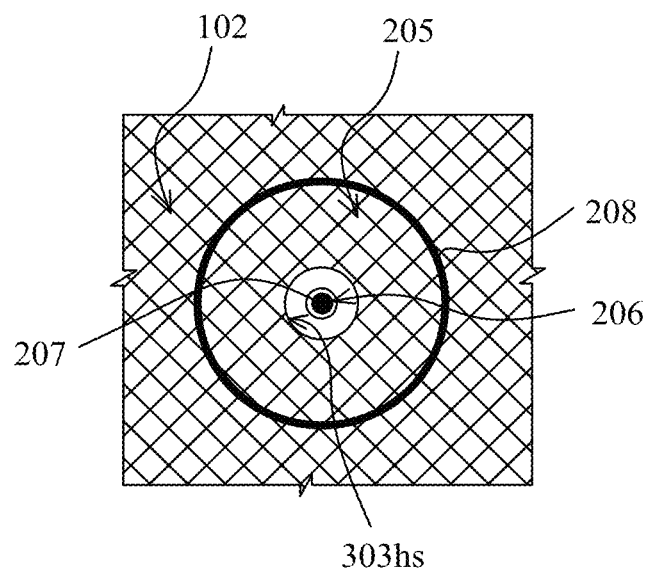
FIG. 6 is a schematic diagram of distribution of orthographic projections of a dielectric reflective film onto a first surface and a second surface based on FIG. 5.

FIG. 3 is an example of a longitudinal section view (which, for example, may be a section view of the ferrule 22 in FIG. 2 along a direction B-B) of a ferrule according to an embodiment of this application. Sizes of components in FIG. 3 do not reflect an actual size proportion, and are provided only for clarifying relative positions of the components. Referring to FIG. 3, for example, a ferrule 001 provided in this embodiment of this application includes a ferrule matrix 100 and an optical fiber 200. A material of the ferrule matrix 100 is but not limited to ceramics or plastics. One or more accommodating through holes 101 are disposed in the ferrule matrix 100 along an axial direction of the ferrule matrix 100. A part of the optical fiber 200 is disposed in the accommodating through hole 200. A side surface of the ferrule matrix 100 along an X-axis direction has a first surface 102. The first surface 102 is a surface that is of the ferrule matrix 100 and that faces a matching ferrule of another connector (each matching ferrule referred to in this embodiment of this application is a ferrule that transmits light to the ferrule provided in this embodiment of this application) when the ferrule 001 matches the matching ferrule. FIG. 4 is an example of an enlarged view of a cross section of the optical fiber 200 in FIG. 3. Referring to FIG. 4, the optical fiber 200 includes a fiber core 201, cladding 203, and a coating 204 that are concentrically disposed from the inside out. When the fiber core 201 transmits light, the light is not confined in the fiber core 201. Instead, a part of the light is scattered to a circular space of the cladding 203 around the fiber core 201. All parts of the fiber core 201 and the cladding 203 that transmit the light are collectively referred to as a main optical path 202. In other words, all the light transmitted through the optical fiber 200 is mainly transmitted through the main optical path 202. For example, the optical fiber 200 is a single-mode fiber. An outer diameter of the fiber core 201 is 9 μm, an outer diameter of the cladding 203 is 125 μm, and an outer diameter of the main optical path 202 is usually 25 μm. Still in FIG. 3, the accommodating through hole 200 includes a first segment e and a second segment f adjacent to each other along a positive X-axis direction. For example, an opening of the first segment e is located on an end face of the ferrule matrix 100 along a negative X-axis direction. An end of the second segment f along the positive X-axis direction is located on the first surface 102. An inner diameter of the first segment e is greater than an inner diameter of the second segment f. For the first segment e, a part of the optical fiber 200 has the coating 204. An outer diameter of the coating 204 thereof matches the inner diameter of the first segment e. Between an outer surface of the coating 204 and an inner wall of the first segment e, a filler 208 (as shown in FIG. 5 and FIG. 6), such as an adhesive, is used for securing. For the second segment f, a part of the optical fiber 200 has the coating 204 removed, and this part is referred to as a bare fiber. A part (which, for example, has a length that is greater than or equal to 1 μm and less than or equal to 3.5 μm) of the bare fiber protrudes from the first surface 102. An outer diameter of the cladding 203 of the bare fiber matches the inner diameter of the second segment f. For example, when the outer diameter of the cladding 203 is 125 μm, the inner diameter of the second segment f may be 127 μm. Between a circumferential outer wall of the cladding 203 and an inner wall of the second segment f, the filler 208, such as the adhesive, is used for securing. FIG. 5 is a schematic partial view obtained by viewing the ferrule matrix 100 and the optical fiber 200 in FIG. 3 along the negative X-axis direction. Referring to FIG. 5, the part that is of the optical fiber 200 and that protrudes from the first surface 102 has a second surface 205 that faces towards the positive X-axis direction. The second surface 205 is a surface that is of the bare fiber of the optical fiber 200 and that faces a matching ferrule of another connector when the ferrule 001 matches the matching ferrule. The second surface 205 is also referred to as an optical transmission surface (that is, light in the ferrule 001 is transmitted out of the optical fiber 200 from the second surface, or light from the matching ferrule enters the optical fiber 200 through the second surface). The main optical path 202 shown in FIG. 3 and FIG. 4 forms a main optical path area 206 on the second surface 205. The fiber core 201 is a core functional component (a core area) for transmitting light and forms an optical core area 207 on the second surface 205. The optical core area 207 is located in the main optical path area 206 and has an area that is usually less than that of the main optical path area 206. The foregoing description (such as the material and the size) of the ferrule 001 may be common and known in the prior art of this field. Details are not described herein.

Still referring to FIG. 3, based on a structure of the ferrule 001 described above, the first surface 102 of the ferrule matrix 100 is further sequentially covered with an anti-reflective film 301, a connecting layer 302, and a dielectric reflective film 303 along the positive X-axis direction. The connecting layer 302 is used to connect the anti-reflective film 301 and the dielectric reflective film 303. With reference to FIG. 3 and FIG. 5 (the anti-reflective film 301, the connecting layer 302, and the dielectric reflective film 303 are not shown in FIG. 5, and therefore reference is made only to relative positions of the first surface 102, the second surface 205, and the main optical path area 206), for example, the anti-reflective film 301 covers the first surface 102, the second surface 205, and a circumferential side surface of the part that is of the bare fiber of the optical fiber 200 and that protrudes from the first surface 102. (In this embodiment of this application, the circumferential side surface is a surface of an optical path surrounded by an optical transmission medium. For example, in FIG. 3 and FIG. 5, the circumferential side surface is a circumferential surface of the bare fiber.) In this case, an orthographic projection of the anti-reflective film 301 onto the first surface 102 entirely covers the first surface 102, and an orthographic projection of the anti-reflective film 301 onto the second surface 205 entirely covers the second surface 205. The dielectric reflective film 303 has a through hole 303*h* and covers the first surface 102. (In this case, an orthographic projection of the dielectric reflective film 303 onto a reference plane M covers an orthographic projection of the first surface 102 onto the reference plane M, where the reference plane M is vertical to an axial direction of the accommodating through hole 101. For example, in FIG. 3, the accommodating through hole 101 extends along the X-axis direction, and the reference plane M is vertical to the X-axis direction.) The dielectric reflective film 303 covers the circumferential surface of the part that is of the bare fiber of the optical fiber 200 and that protrudes from the first surface 102. The dielectric reflective film 303 covers a part of the second surface 205 (that is, the orthographic projection of the dielectric reflective film 303 onto the reference plane M covers a part of an orthographic projection of the second surface 205 onto the reference plane M). In addition, the dielectric reflective film 303 covers a gap between the ferrule matrix 100 and the circumferential side surface of the bare fiber of the optical fiber 200 (in other words, an orthographic projection of the gap onto the reference plane M is entirely covered by the orthographic projection of the dielectric reflective film 303 onto the reference plane M), such that the dielectric reflective film 303 shields a filler 208 in the gap. FIG. 6 shows distribution of orthographic projections of the dielectric reflective film 303 onto the first surface 102 and the second surface 205 based on FIG. 5, where a grid shaded part in FIG. 6 indicates the orthographic projection of the dielectric reflective film 303 onto the first surface 102 and the second surface 205. Referring to FIG. 6, the orthographic projection of the dielectric reflective film 303 onto the first surface 102 covers the first surface 102. The orthographic projection of the dielectric reflective film 303 onto the second surface 205 covers a part of the second surface 205. The through hole 303*h* is opposite to the main optical path area 206. An orthographic projection 303*hs* of the through hole 303*h* onto the second surface 205 covers the main optical path area 206. In addition, an orthographic projection 303*hs* of the through hole 303*h* onto the reference plane M (which is shown in FIG. 3) entirely falls within the orthographic projection of the second surface 205 onto the reference plane M. A width of a gap between an edge of the orthographic projection 303*hs* of the through hole 303*h* onto the second surface 205 and an edge of the main optical path area 206 may be exactly greater than or equal to 0 μm and less than or equal to 50 μm. In this way, the dielectric reflective film 303 can shield the filler 208 but not the main optical path area 206. More specifically, the width of the gap between the edge of the orthographic projection 303*hs* of the through hole 303*h* onto the second surface 205 and the edge of the main optical path area 206 may be exactly greater than or equal to 12.5 μm and less than or equal to 42.5 μm. For example, the width of the gap may be 12.5 μm, 15 μm, 17 μm, 20 μm, 23 μm, 25 μm, 30 μm, 35 μm, 40 μm, or 42.5 μm. In this way, the edge of the orthographic projection 303*hs* of the through hole 303*h* onto the second surface 205 is prevented from being excessively close to the edge of the main optical path area 206 or an edge of the second surface 205. This improves production efficiency and is beneficial to mass production. For example, the outer diameter of the fiber core 201 is 9 μm, the outer diameter of the cladding 203 (that is, a diameter of the second surface 205) is 125 μm, and the main optical path area 206 is a circle with an diameter of 25 μm. In this case, the orthographic projection 303*hs* of the through hole 303*h* onto the second surface 205 may be a circle with a diameter that is greater than or equal to 50 μm and less than or equal to 110 μm (for example, the circle is concentric with the main optical path area 206). Alternatively, the orthographic projection 303*hs* of the through hole 303*h* onto the second surface 205 is not a circle but exactly falls between the two concentric circles whose diameters are 50 μm and 110 μm respectively. In this way, the dielectric reflective film 303 can shield the filler 208 but not the main optical path area 206. Compared with a case in which the orthographic projection 303*hs* totally overlaps the main optical path area 206, this is beneficial to mass production. In another case, the edge of the orthographic projection 303*hs* of the through hole 303*h* onto the second surface 205 may alternatively be located inside the main optical path area 206 but outside the optical core area 207. In this way, the dielectric reflective film 303 may block a part of light that enters the main optical path 202, but most of the light still enters the fiber core 201. The connecting layer 302 is filled between the anti-reflective film 301 and the dielectric reflective film 303 to connect the anti-reflective film 301 and the dielectric reflective film 303. This ensures adhesion and smooth transition between the anti-reflective film 301 and the dielectric reflective film 303, and avoids delamination between the anti-reflective film 301 and the dielectric reflective film 303. For example, a layer close to the dielectric reflective film 303 of the anti-reflective film 301 is made of $SiO_2$, and a layer close to the anti-reflective film of the dielectric reflective film 303 is also made of $SiO_2$. In this case, if the connecting layer 302 is also made of $SiO_2$, the anti-reflective film 301 is tightly connected to the dielectric reflective film 303 due to the similarity-intermiscibility principle.

The anti-reflective film 301 of the ferrule 001 in FIG. 3 may be of a following structure: an Mg compound/$SiO_2$, a Ta compound/$SiO_2$, a Ti compound/$SiO_2$, an Hf compound/$SiO_2$, or the like. A thickness of the anti-reflective film 301 is greater than or equal to 400 nm and less than or equal to 800 nm. Alternatively, the anti-reflective film 301 may be of a structure that is known and commonly used in the prior art. An anti-reflective band of the anti-reflective film 301 includes at least a part of a communication band of the optical fiber 200'. To ensure that a loss caused after an optical signal enters the main optical path 202 meets a standard, a reflectivity of the anti-reflective film 301 for an optical wave within the anti-reflective band is less than or equal to 0.25%. For example, the reflectivity is 0.25%, 0.22%, 0.20%, 0.17%, 0.15%, 0.1%, 0.08%, or 0.05%. In some cases, the reflectivity of the anti-reflective film 301 for the optical wave within the anti-reflective band is less than or equal to 0.1%. This may significantly reduce a loss caused after an optical signal enters the main optical path 202. In addition, each film layer of the anti-reflective film 301 may be made of a material with a relatively high Laser Induced Damage Threshold (LIDT). For example, a material of the anti-reflective film 301 can tolerate an energy of at least 600 mw/cm$^2$ (a maximum energy tolerance of the material of the anti-reflective film 301 is tested by irradiating the material of the anti-reflective film 301 using a laser beam with a wavelength of 1064 nm and a diameter of 0.53 mm and continuously increasing an optical power). In this way, the anti-reflective film 301 can have good temperature resistance. To an extent, this reduces a probability of burning down of the ferrule 001. In addition, this improves high-power tolerance of the ferrule matrix 100 and the optical fiber 200 without changing materials of the ferrule matrix 100 and the optical fiber 200. The dielectric reflective film 303 may be of a following structure: Si/SiO$_2$, an Ag compound/SiO$_2$, an Al compound/SiO$_2$, an Au compound/SiO$_2$, or a Ti compound/SiO$_2$. Alternatively, the dielectric reflective film 303 may be of a structure that is known and commonly used in the prior art. A reflective band of the dielectric reflective film 303 includes at least a part of a communication band of the optical fiber 200. To prevent the first surface 102, the second surface 205, and the filler 208 from being burnt down, a reflectivity of the dielectric reflective film 303 for an optical wave within the reflective band is greater than or equal to 80%. For example, the reflectivity is 80%, 85%, 90%, 95%, or 98%. In addition, each film layer of the dielectric reflective film 303 may be made of a material with a relatively high LIDT. For example, a material of the dielectric reflective film 303 can tolerate an energy of at least 600 mw/cm$^2$ (a maximum energy tolerance of the material of the anti-reflective film 301 is tested by irradiating the material of the dielectric reflective film 303 using a laser beam with a wavelength of 1064 nm and a diameter of 0.53 mm and continuously increasing an optical power). This improves high-power tolerance of the ferrule matrix 100 and the optical fiber 200.

Figure 7:
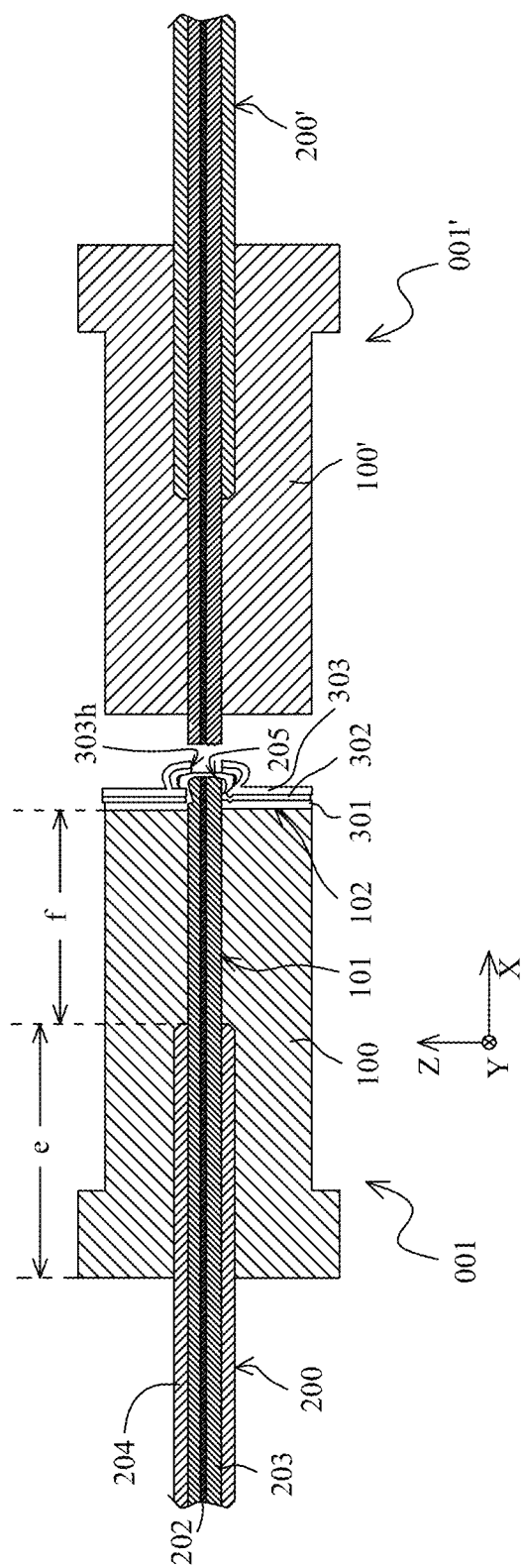
FIG. 7 is a schematic diagram of a scenario in which a ferrule 001 and a ferrule 001' match each other according to an embodiment of this application.

FIG. 7 is a schematic diagram of a scenario in which a ferrule 001 and a ferrule 001' are used in combination according to an embodiment of this application. The ferrule 001' includes a ferrule matrix 100' and an optical fiber 200' extending through the ferrule matrix 100'. When the ferrule 001' is used as a matching ferrule to match the ferrule 001, the ferrule 001' is placed on a side of the ferrule 001 along a positive X-axis direction, a first surface 102 faces the ferrule matrix 100', and a second surface 205 is opposite to a light-exiting end face that is of an optical fiber 200' and that is disposed along a negative X-axis direction. In this way, light is transmitted from a main optical path of the optical fiber 200' to a main optical path area 206 of the second surface 205 along the negative X-axis direction, and continues to be transmitted along a main optical path 202. The second surface 205 is covered with an anti-reflective film 301, and the anti-reflective film 301 may reduce Fresnel reflection caused by direct exposure of the second surface 205 to air. Therefore, a loss of an optical signal during transmission is reduced. However, in an actual operation (for example, when the ferrule 001 or the ferrule 001' is plugged or unplugged), it is difficult for light transmitted from the main optical path of the optical fiber 200' to entirely fall within the main optical path area 206. For example, the main optical path of the fiber 200' is misaligned with the main optical path area 206, or the main optical path of the optical fiber 200' and the main optical path 202 of the optical fiber 200 do not extend along a same straight line. In addition, the light transmitted from the main optical path of the optical fiber 200' may be deviated from the main optical path due to refraction or another factor. In this case, the light from the optical fiber 200' is transmitted to an area of the second surface 205 other than the main optical path area 206 and the first surface 102. When the light from the optical fiber 200' is transmitted to the first surface 205, the dielectric reflective film 303 on the first surface 205 reflects the light to another direction. In this case, only a small part of the light is absorbed by the dielectric reflective film 303 and converted to heat. The heat is insufficient to cause burning down of the first surface 102 of the ferrule matrix 100. In addition, even if the dielectric reflective film 303 on the second surface 205 is tainted with an impurity such as dust, the dielectric reflective film 303 reflects most of the light. In this case, heat converted from remaining light is insufficient to burn the impurity. Similarly, the filler 208 cannot be easily burnt down.

Figure 8:
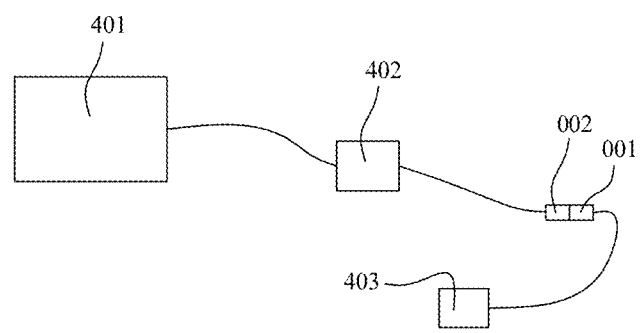
FIG. 8 is a schematic diagram of an apparatus used for high-power testing when the ferrule 001 and the ferrule 001' in FIG. 7 are used in combination.

FIG. 8 is a schematic diagram of an apparatus used for high-power testing when the ferrule 001 and the ferrule 001' are used in combination. Referring to FIG. 8, a light source 401, an optical attenuator 402, and the ferrule 001' are sequentially connected using an optical fiber. The ferrule 001' matches the ferrule 001. An output end of the ferrule 001 is connected to an optical power meter 403 using an optical fiber. The light source 401 separately outputs powers of 17 dBm, 17.5 dBm, 18 dBm, 18.5 dBm, 25 dBm, 27 dBm, and 30 dBm. Then, an end face detector is used to detect the first surface 102 and the second surface 205 of the ferrule 001 respectively. A detection result shows that the ferrule 001 is not burnt down when the ferrule 001 receives a power of 30 dBm (which corresponds to an energy of about 1000 mw). Therefore, the ferrule 001 has far better performance in surviving from being burnt down, compared with a conventional MT ferrule that is usually burnt down when the conventional MT ferrule receives a power greater than 17 dBm (which corresponds to an energy of about 50 mw).

Still in FIG. 7, an orthographic projection of a through hole 303h onto the second surface 205 covers only a part of the second surface 205. In this case, when the ferrule 001' is connected to the ferrule 001, and an outer diameter of the optical fiber 200' is the same as (or greater than) that of the optical fiber 200, a light-exiting end face of the optical fiber 200' can at best contact the dielectric reflective film 303 and cannot penetrate into the through hole 303h. To be specific, the dielectric reflective film 303 elevates the optical fiber 200', such that it is difficult for the light-exiting end face of the optical fiber 200' to directly contact the anti-reflective film 301 at a bottom of the through hole 303h. Therefore, the anti-reflective film 301 cannot be easily scratched by the light-exiting end face of the optical fiber 200'. In addition, the anti-reflective film 301 at the bottom of the through hole 303h is located on a path for transmitting an optical signal, such that a loss of the optical signal during transmission is reduced. For example, a thickness of the dielectric reflective film 303 is greater than or equal to 1.0 μm and less than or equal to 3.0 μm. For example, the thickness may be 1.0 μm, 1.2 μm, 1.5 μm, 1.7 μm, 2.0 μm, 2.2 μm, 2.5 μm, 2.8 μm, or 3.0 μm. When the thickness of the dielectric reflective film is less than 1.0 μm, the dielectric reflective film 303 is too thin, and therefore the through hole 303h is too shallow. In this case, the anti-reflective film 301 at the bottom of the through hole 303h is easily scratched by a foreign matter (such as a corner of the optical fiber 200'). When the thickness of the dielectric reflective film 303 is greater than 3.0 μm, the dielectric reflective film 303 is too thick, and therefore the through hole 303h is too deep and space in the through hole 303h is large. In this case, dust can easily enter the through hole 303h and cannot be easily removed. This affects transmission of an optical signal. When the thickness of the dielectric reflective film 303 is greater than or equal to 1.0 μm and less than or equal to 3.0 μm, both of the foregoing problems may be avoided. In addition, when the thickness of the dielectric reflective film 303 is within the foregoing range, a reflectivity of the dielectric reflective film 303 can be good. A test shows that within 1000 times of plugging and unplugging of the ferrule 001 and the ferrule 001', a surface of the anti-reflective film 301 at the bottom of the through hole 303h does not need to be cleaned. Throughout the test, an Insertion Loss (IL) is less than 0.25 dB and a loss change is less than 0.05 dB. It should be noted that despite a gap between the second surface 205 of the optical fiber 200 and the light-exiting end face of the optical fiber 200', existence of the anti-reflective film 301 can reduce, to an extent, an optical signal loss caused by Fresnel reflection.

In addition, a low optical signal loss can be achieved without direct contact between the light-exiting end face of the optical fiber 200' and the second surface 205 of the optical fiber 200. Therefore, when the ferrule 001 matches the ferrule 001', the Fresnel reflection can be reduced without a need of applying a large force to press together the second surface 205 of the optical fiber 200 and the light-exiting end face of the optical fiber 200' to remove an air gap. Further, the ferrule 001 can be formed by attaching the dielectric reflective film 303 and the anti-reflective film 301 onto a conventional MT ferrule without changing a structure of the conventional MT ferrule. In this way, the ferrule 001 provided in this embodiment of this application can directly match the conventional MT ferrule. Mechanical docking is directly used to match the ferrule 001 and the conventional MT ferrule, and heat welding is not required. This prevents a temperature-sensitive device from being easily damaged. The ferrule 001 provided in this embodiment of this application can be easily applied to a temperature-sensitive component.

In some cases, if another measure is taken to eliminate the Fresnel reflection at the second surface 205, the anti-reflective film 301 may be removed. For example, the dielectric reflective film 303 directly contacts the first surface 102 and the second surface 205. In some other cases, the dielectric reflective film 303 may not cover the second surface 205. For example, the dielectric reflective film 303 may only cover the first surface 102 (that is, an orthographic projection of the dielectric reflective film 303 onto the reference plane M covers only an orthographic projection of the first surface 102 onto the reference plane M). Alternatively, the dielectric reflective film 303 may only cover the first surface 102 and the circumferential side surface of a part that is of the optical fiber 200 and that protrudes from the first surface 301. Alternatively, the dielectric reflective film 303 may only cover the first surface 102 and an area of the second surface 205 other than the main optical path area.

Figure 9A:
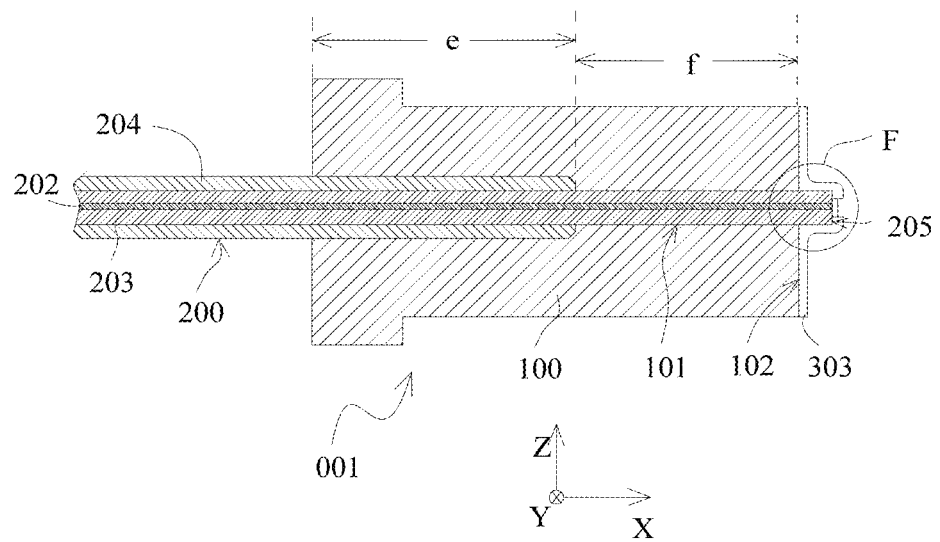
FIG. 9a is an example of another schematic diagram of a ferrule according to an embodiment of this application.
Figure 9B:
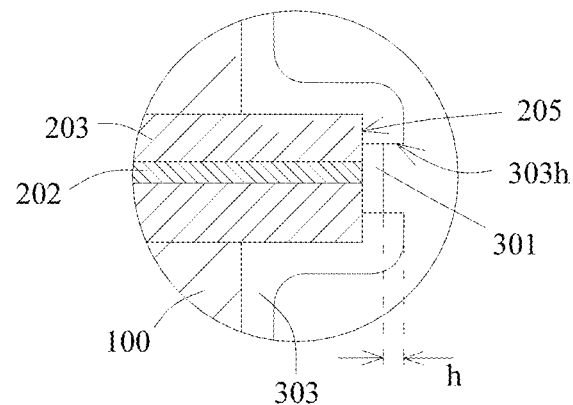

It should be noted that the ferrule provided in the embodiments of this application is not limited to a specific form of the ferrule 001 shown in FIG. 3. For example, the anti-reflective film 301 in FIG. 3 may only cover the second surface 205, and this can also reduce the Fresnel reflection at the second surface 205 to an extent. FIG. 9a is an example of another schematic diagram of a ferrule according to an embodiment of this application. FIG. 9b is a partially enlarged view of a portion F in FIG. 9a. Referring to FIG. 9a and FIG. 9b, a difference between a ferrule 001 shown in FIG. 9a and FIG. 9b and the ferrule 001 shown in FIG. 3 is that an anti-reflective film 301 and a dielectric reflective film 303 are disposed at a same layer. The anti-reflective film 301 is disposed in a through hole 303h and closely attached to a second surface 205, to ensure that no intermediate medium, such as air, exists between the anti-reflective film 301 and the second surface 205. To an extent, this reduces Fresnel reflection caused when light is transmitted onto the second surface 205. In addition, in this case, a thickness of the anti-reflective film 301 may be less than that of the dielectric reflective film 303. Therefore, a surface that is of the anti-reflective film 301 and that faces a matching ferrule is recessed from a surface that is of the dielectric reflective film 303 and that faces the matching ferrule. In other words, there is a height difference h between the surface of the dielectric reflective film 303 and the surface of the anti-reflective film 301. The height difference h between the surface of the dielectric reflective film 303 and the surface of the anti-reflective film 301 is greater than or equal to 0.8 μm and less than or equal to 2.8 μm. For example, the height difference h may be 0.8 μm, 1.0 μm, 1.2 μm, 1.5 μm, 1.7 μm, 2.0 μm, 2.3 μm, 2.5 μm, or 2.8 μm. This can prevent the anti-reflective film 301 from being scratched and prevent the through hole 303h from retaining dust.

Figure 10:
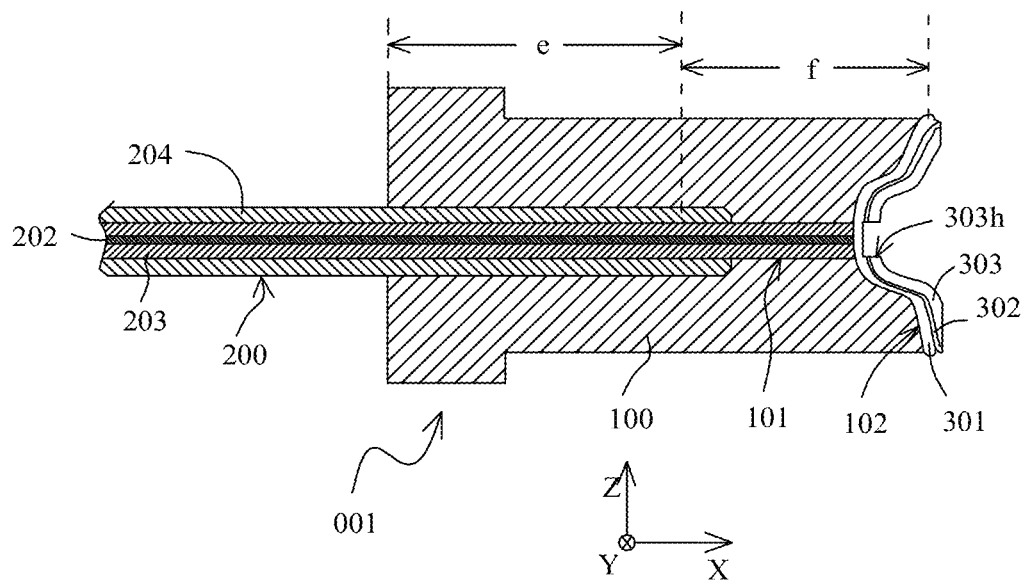
FIG. 10 is an example of another schematic diagram of a ferrule according to an embodiment of this application.

FIG. 10 is an example of another schematic diagram of a ferrule 001 according to an embodiment of this application. Referring to FIG. 10, a difference between the ferrule 001 shown in FIG. 10 and the ferrule 001 shown in FIG. 3 is that a middle part of a first surface 102 is recessed towards an interior of a ferrule matrix 100, such that a second surface 205 is aligned with a bottom of the first surface 102. The ferrule 001 shown in FIG. 10 may be used in combination with the ferrule 001 shown in FIG. 3. The part that is of the optical fiber 200 of the ferrule 001 shown in FIG. 3 and that protrudes from the first surface 102 matches a recess formed on the first surface 102 of the ferrule 001 shown in FIG. 10. This prevents lateral misalignment between the two ferrules, and avoids a high optical signal loss due to an excessively large distance between the second surfaces of the two ferrules (the distance needs to be less than or equal to 5 μm, such as 1 μm, 2 μm, 3 μm, 4 μm, or 5 μm).

In addition, the ferrule 001 shown in FIG. 3 may be modified in the following manners to obtain variants. For example, the second surface 205 of the optical fiber 200 is aligned with the first surface 102 or is recessed from the first surface 102. For another example, a temperature resistant film, such as a ceramic film or a metal film, that can tolerate a relatively high temperature may be filled at an inner side of the dielectric reflective film 303 shown in FIG. 3 (for example, between the dielectric reflective film 303 and the anti-reflective film 301). A coverage area of the temperature resistant film may be adjusted based on the dielectric reflective film 303. The ceramic temperature resistant film or the metal temperature resistant film is formed on a surface of the anti-reflective film 301 through electroplating. Generally, the temperature resistant film, such as the ceramic film or the metal film, (a material of the metal film is Al, Ag, Ti, Au, Cr, or the like, but because the metal is prone to be oxidized, a protection layer made of $SiO_2$, $MgF_2$, or the like is typically coated over the metal through PVD physical vapor deposition) can tolerate a temperature higher than 1700° C. In this way, temperature resistance of the reflective film is greatly improved. To further improve a laser-induced damage threshold and the temperature resistance of the reflective film, a dielectric reflective film, a ceramic reflective film, or a metal reflective film may further be formed on the temperature resistant film and be used as a reflective film, to reflect light and prevent the temperature resistant film from being burnt down. In another variant, the bare fiber of the optical fiber 200 may alternatively be recessed from the first surface 102, and the dielectric reflective film 303 is disposed on the inner wall of the accommodating through hole 101. Alternatively, the second surface 205 is aligned with the first surface 102, and the dielectric reflective film 303 covers a gap between the accommodating through hole 101 and the circumferential side surface of the bare fiber of the optical fiber 200.

It should be noted that in the foregoing embodiments of this application, only a fiber ferrule is used as an example of the ferrule. For a ferrule of an optical waveguide connector, an optical waveguide instead of an optical fiber is disposed in a ferrule matrix. The optical waveguide has a core channel (namely, a core area) whose refractive index is greater than that of the matrix. The core channel extends to an end face of the waveguide and forms an optical core area on the end face of the waveguide. Similar to the optical fiber 200 described above, a small part of light in the optical core channel may be scattered to the matrix surrounding the core channel. Therefore, a main optical path is formed, and the main optical path forms a main optical path area on the end face of the optical waveguide. These structures may be based on the prior art. On this basis, a reflective film is formed on the end face of the waveguide, where the reflective film is disposed away from the optical core area to avoid blocking most of light. Alternatively, the reflective film may be disposed away from both the optical core area and the main optical path area, to ensure that all light from the main optical path is not blocked. In addition, an anti-reflective film may further be disposed on a light-entering end face of the optical waveguides. For a manner of disposing the anti-reflective film and the reflective film, refer to the manner of disposing corresponding film layers in the fiber ferrule in the foregoing embodiments. In addition, a ferrule of an optical fiber array connector includes a ferrule matrix, covers disposed opposite to each other in the ferrule matrix, and an array of optical fibers secured between the covers. For details, refer to an existing ferrule structure of the optical fiber array connector. A reflective film is disposed on a light-entering end face of an optical fiber. The reflective film is disposed away from an optical core area or away from both the optical core area and a main optical path area. In addition, the reflective film may also cover an end face of the cover. To sum up, the optical transmission medium in the ferrule matrix is not limited to the optical fiber and may alternatively be the optical waveguide or another form of optical transmission medium to form another form of ferrule, provided that the reflective film is formed, away from the optical core area (or both the optical core area and the main optical path area), on an end face (that is, an end face facing a matching ferrule, for example, a light-entering end face) of the optical transmission medium.

In an embodiment, a connector includes a housing and the ferrule provided in the foregoing embodiments of this application. For example, in FIG. 1, reference may be made to the MPO connector 20 in FIG. 1 for an example form of the connector provided in this embodiment of this application. The MPO connector 20 includes a housing 21 and a ferrule 22. The ferrule 22 is disposed in the housing 21. The ferrule 22 may be the ferrule 001 provided in the embodiments in FIG. 3 to FIG. 10.

Figure 11:
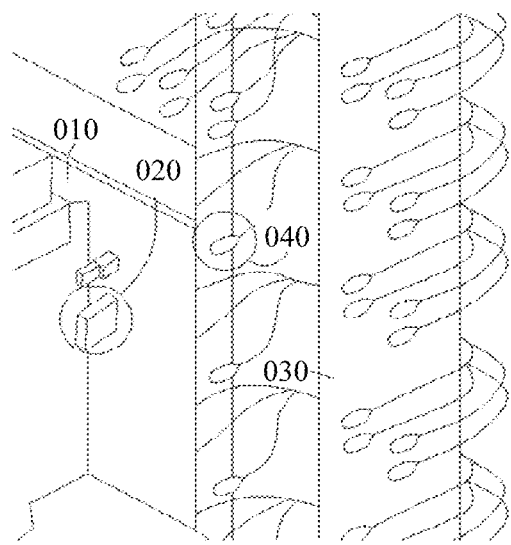
FIG. 11 is an example of a schematic diagram of matching between an optical backplane and a board according to an embodiment of this application.

In an embodiment, an optical communication element includes an optical communication element body and the ferrule provided in the foregoing embodiments of this application. The ferrule is connected to the optical communication element body. In some cases, the optical communication element includes an optical communication element body and a connector. The connector includes the ferrule provided in the foregoing embodiments of this application. The ferrule is connected to the optical communication element body. In this case, the optical communication element body, for example, may be a board. FIG. 11 is an example of a schematic diagram of matching between an optical backplane and a board according to an embodiment of this application. Referring to FIG. 11, for example, an optical communication element includes a board 010 and a connector 020. The board 010 serves as an optical communication element body, and the connector 020 includes the ferrule provided in the foregoing embodiments of this application. The connector 020 is secured onto the board 010. The ferrule is connected to a communications line in the board 010. For some other optical communication elements, a ferrule needs to be assembled into an optical connector only when the some other optical communication elements each needs to be assembled with another optical communication element. In this case, an optical communication element body may be an optical backplane, an optical fiber bundle backplane, a co-packaged module, or a WSS module. Still referring to FIG. 11, for example, another optical communication element includes an optical backplane 030 and a ferrule 040. The optical backplane 030 serves as an optical communication element body. The ferrule 040 is connected to the optical backplane 030 using a shared optical fiber.

An embodiment of this application further provides a communications device. For example, the communications device may be a router, a switch, and the like. The communications device includes a matching optical communication element (the matching optical communication element includes the optical backplane 030 and the ferrule 040 in FIG. 11) and at least one optical communication element provided in the foregoing embodiments. The matching optical communication element includes a matching ferrule (such as the ferrule 040 in FIG. 11). A ferrule (such as the ferrule of the connector 020 in FIG. 11) of the optical communication element (the optical communication element includes the board 010 and the connector 020 in FIG. 11) is connected to the matching ferrule (such as the ferrule 040 in FIG. 11).

Figure 12A:
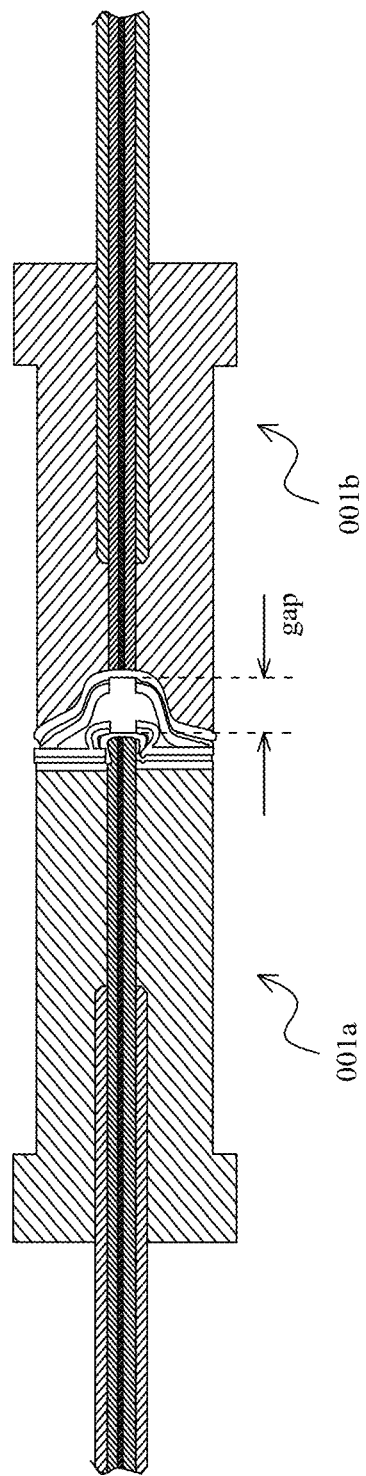
FIG. 12a is an example of a schematic diagram of a scenario in which a ferrule and a matching ferrule of a communications device are used in combination according to an embodiment of this application.
Figure 12B:
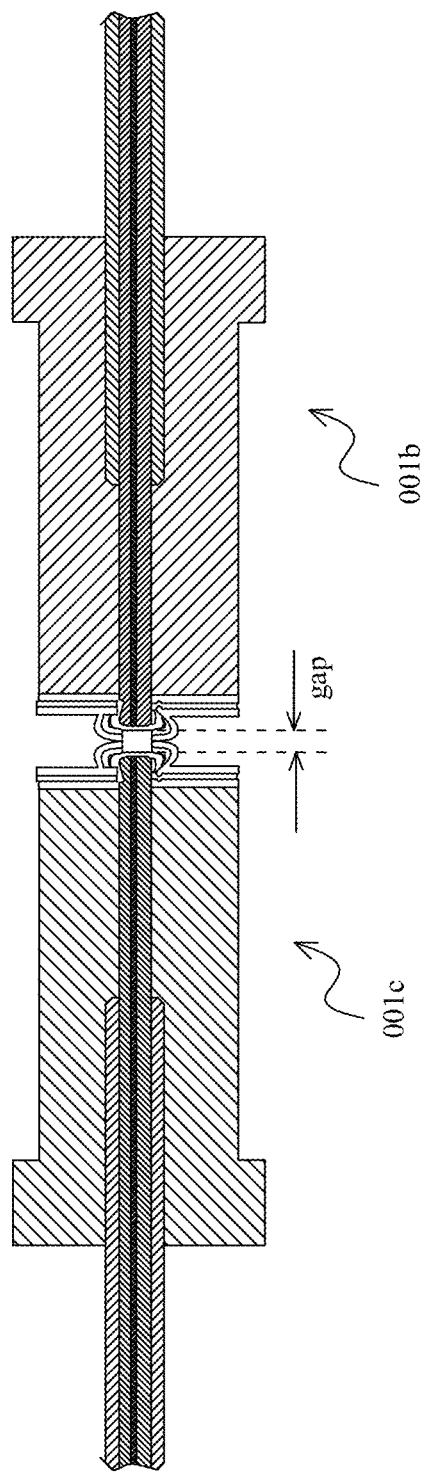
FIG. 12b is an example of another schematic diagram of a scenario in which a ferrule and a matching ferrule of a communications device are used in combination according to an embodiment of this application.

FIG. 12a is an example of a schematic diagram of a scenario in which a ferrule and a matching ferrule of a communications device are used in combination according to an embodiment of this application. A structure of a ferrule 001a in FIG. 12a is the same as that of the ferrule 001 in FIG. 3. A structure of a ferrule 001b is the same as that of the ferrule 001 in FIG. 10. The ferrule 001a and the ferrule 001b match each other. When the ferrule 001b serves as the matching ferrule, and an optical fiber in the ferrule 001b transmits light to an anti-reflective film on a second surface of the ferrule 001a, a gap between a bottom surface (the anti-reflective film of the ferrule 001a is exposed to a surface of a through hole, and the bottom surface of the through hole is the second surface of the ferrule 001a if the anti-reflective film is removed from the ferrule 001a) of a groove surrounded by a side wall of the through hole in the ferrule 001a and a light-exiting surface (an anti-reflective film of the ferrule 001b is exposed to a surface of the through hole, and the light-exiting surface is a second surface of the ferrule 001b if the ferrule 001b is not provided with an anti-reflective film) of the ferrule 001b is less than or equal to 5 µm. For example, the gap is 1 µm, 2 µm, 3 µm, 4 µm, or 5 µm. This avoids low transmission efficiency of an optical signal due to an excessively large gap. Similarly, if the ferrule 001a serves as the matching ferrule and transmits an optical signal to the ferrule 001b, a requirement for the gap in FIG. 12a does not change. FIG. 12b is an example of another schematic diagram of a scenario in which a ferrule and a matching ferrule of a communications device are used in combination according to an embodiment of this application. Structures of the ferrule 001c and the ferrule 001d in FIG. 12b are the same as that of the ferrule 001 in FIG. 3. When the ferrule 001c and the ferrule 001d match each other, a requirement for a gap shown in FIG. 12b is the same as that for the gap shown in FIG. 12a, regardless of which ferrule serves as the matching ferrule. To sum up, when the ferrule of the optical communication element matches the matching ferrule of the matching optical communication element, the gap gap between the bottom surface of the groove surrounded by the side wall of the through hole in the ferrule and the light-exiting surface of the matching ferrule is less than or equal to 5 µm.

Figure 13A:
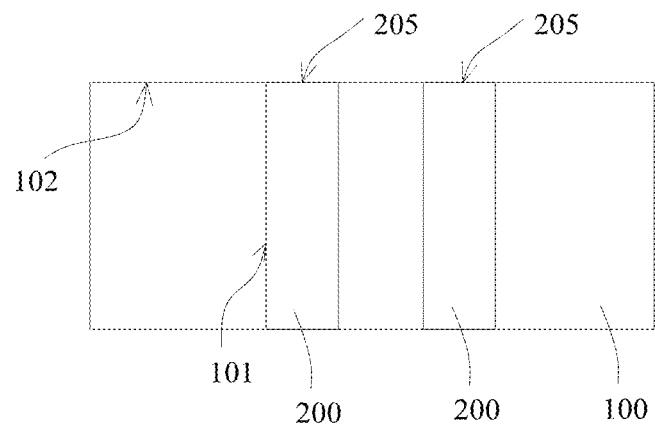
FIG. 13a is a schematic diagram in which a ferrule matrix matches an optical fiber before step S100 according to a ferrule preparation method provided in an embodiment of this application.
Figure 13B:
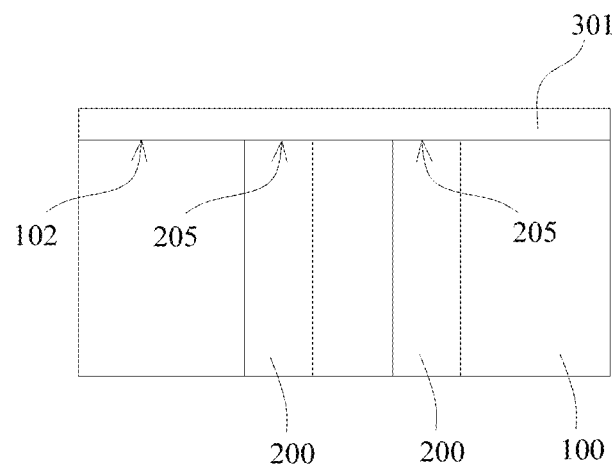
FIG. 13b is a schematic diagram of a ferrule obtained after step S100 according to a ferrule preparation method provided in an embodiment of this application.
Figure 13C:
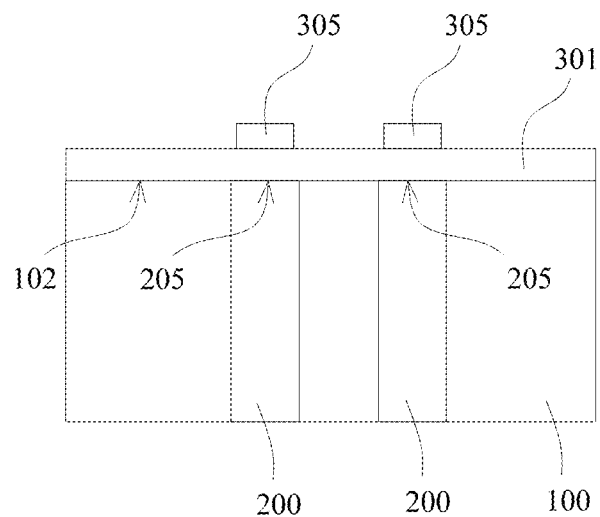
FIG. 13c is a schematic diagram of a ferrule obtained after step S200 according to a ferrule preparation method provided in an embodiment of this application.
Figure 13D:
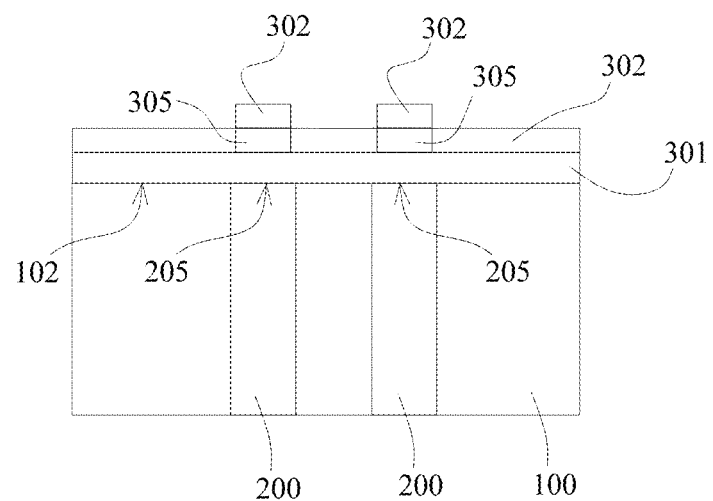
FIG. 13d is a schematic diagram of a ferrule obtained after step S300 according to a ferrule preparation method provided in an embodiment of this application.
Figure 13E:
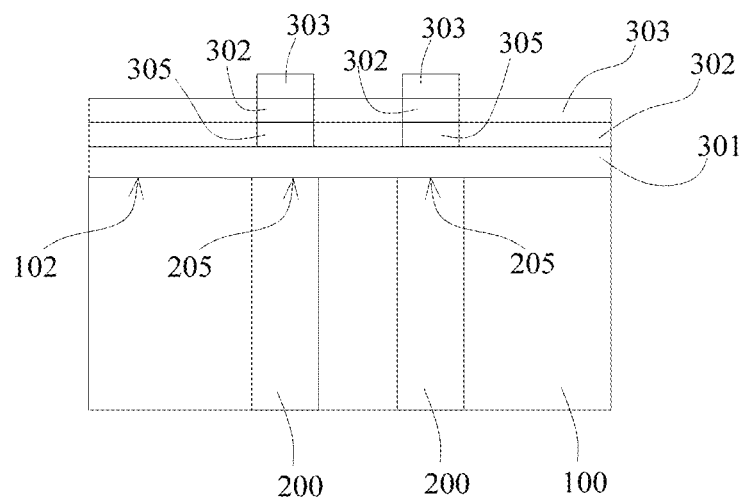
FIG. 13e is a schematic diagram of a ferrule obtained after step S400 according to a ferrule preparation method provided in an embodiment of this application.
Figure 13F:
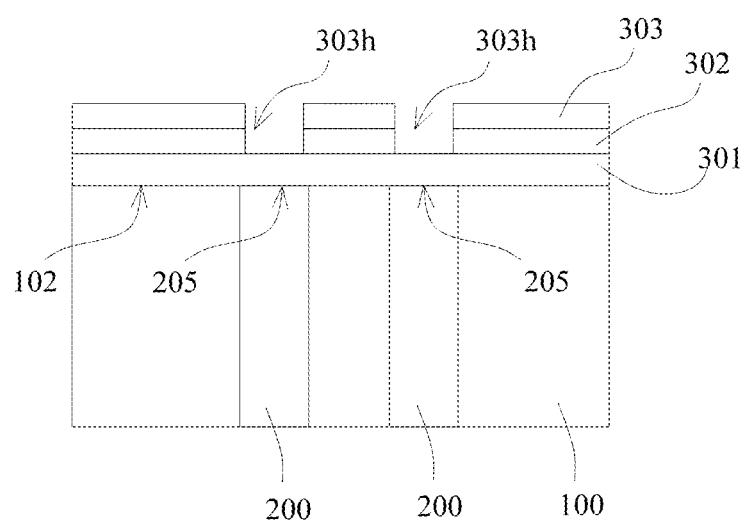
FIG. 13f is a schematic diagram of a ferrule obtained after step S500 according to a ferrule preparation method provided in an embodiment of this application.

An embodiment of this application further provides a method for preparing a ferrule. For a form of the ferrule, refer to the specific implementations of the ferrule shown in FIG. 3 to FIG. 10. FIG. 13a is a schematic diagram in which a ferrule matrix matches an optical fiber before step S100 according to a ferrule preparation method provided in this embodiment of this application. Referring to FIG. 13a, an optical fiber 200 is disposed in a matching through hole 101 in a ferrule matrix 100. A second surface 205 of the optical fiber 200 is aligned (or may be not aligned) with a first surface 102 of the ferrule matrix 100. In addition, for another configuration relationship between the optical fiber 200 and the ferrule matrix 100, refer to description corresponding to the ferrule matrix 001 shown in FIG. 3. FIG. 13b is a schematic diagram of a ferrule obtained after step S100 according to the ferrule preparation method provided in this embodiment of this application. Referring to FIG. 13b, in step S100, an anti-reflective film 301 is formed on the second surface 205, where the anti-reflective film 301 may alternatively cover both the second surface 205 and the first surface 102. FIG. 13c is a schematic diagram of a ferrule obtained after step S200 according to the ferrule preparation method provided in this embodiment of this application. In step S200, a sacrificial layer 305 is formed on the anti-reflective film 301. An orthographic projection of the sacrificial layer 305 onto the corresponding second surface 205 covers a main optical path area of the second surface 205 (in some cases, the orthographic projection may only cover an optical core area of the second surface 205). In addition, an area of the orthographic projection of the sacrificial layer 305 onto the corresponding second surface 205 is less than an area of the second surface 205. An area of an orthographic projection of the sacrificial layer 305 onto the first surface 102 is zero. The sacrificial layer 305 may be made of a material that can be easily removed, such as a material that becomes less sticky and detaches from the anti-reflective film 301 due to heat, or a microporous material. The sacrificial layer 305 may be made of a specific material known and commonly used in this field. Details are not described herein. FIG. 13d is a schematic diagram of a ferrule obtained after step S300 according to the ferrule preparation method provided in this embodiment of this application. Referring to FIG. 13d, in step S300, a connecting layer 302 is formed on a surface of the sacrificial layer 301. FIG. 13e is a schematic diagram of a ferrule obtained after step S400 according to the ferrule preparation method provided in this embodiment of this application. Referring to FIG. 13e, in step S400, a dielectric reflective film 303 is formed on a surface of the connecting layer 302. The dielectric reflective film covers the first surface 102 and the second surface 205. FIG. 13f is a schematic diagram of a ferrule obtained after step S500 according to the ferrule preparation method provided in this embodiment of this application. Referring to FIG. 13f, in step S500, the sacrificial layer 305 is removed. In other words, the sacrificial layer 305 is detached from the anti-reflective film 301. A part of the connecting layer 302 and a part of the dielectric reflective film 303 that are located on the sacrificial layer 305 are removed together with the sacrificial layer 305. In this way, a through hole 303h is formed at each position where the dielectric reflective film 303 is opposite to the main optical path area of the second surface 205.

For a specific coverage area and form of the dielectric reflective film 303, refer to descriptions of the ferrule in the foregoing embodiments, provided that an orthographic projection of the dielectric reflective film 303 onto a reference plane M covers an orthographic projection of the first surface 102 onto the reference plane M. When a surface of the dielectric reflective film 303 and a surface of the anti-reflective film 301 that are close to each other have relatively good adhesion, step S300 in which the connecting layer 302 is formed may be skipped. In some other cases, in addition to disposing the sacrificial layer 305, the through hole 303h may alternatively be formed in the following manner: A whole layer of the dielectric reflective film 303 is first formed. Then, the dielectric reflective film 303 is patterned at a position opposite to the main optical path area of the second surface 205, to form the through hole 303h. For example, the through hole 303h is formed through etching using a mask. Alternatively, the through hole 303h is formed in another manner. In some other cases, before the dielectric reflective film 303 is formed, a temperature resistant film, such as a ceramic film and a metal film, that can tolerate a relatively high temperature may be first formed. After the dielectric reflective film 303 is formed on the temperature resistant film, the sacrificial layer is removed, to form a through hole that penetrates the temperature resistant film and the dielectric reflective film (for a position and a size of the through hole, refer to the through hole 303h). In some other cases, step S100 in which the anti-reflective film 300 is formed may also be skipped. After the through hole 303h is formed, the anti-reflective film is formed in the through hole 303h through deposition or in another manner, provided that the anti-reflective film is disposed on a side of the second surface 205 of the optical fiber 200 and an orthographic projection of the anti-reflective film onto the second surface 205 covers the main optical path area of the second surface. In addition, the optical fiber 200 may alternatively be replaced with a waveguide or another form of optical transmission medium to form a different form of ferrule, provided that the following conditions are satisfied: A surface that is of the optical transmission medium and that faces a matching ferrule includes a main optical path area; and an orthographic projection of the reflective film onto the surface that is of the optical transmission medium and that faces the matching ferrule does not cover the main optical path area.

In addition, for other parameters (such as materials, sizes, positions, and the like) of the anti-reflective film 301, the connecting layer 302, the dielectric reflective film 303, and the like, refer to descriptions of the corresponding structures in the ferrule in the foregoing embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A ferrule, comprising:
    a ferrule matrix including an accommodating through hole, wherein one end of the accommodating through hole is located on a first surface of the ferrule matrix that faces a matching ferrule of the ferrule;
    an optical transmission medium including a second surface that faces the matching ferrule, wherein the second surface of the optical transmission medium is an optical transmission surface, and the optical transmission medium is disposed in the accommodating through hole;
    a reflective film covering the first surface of the ferrule matrix, wherein a reflective band of the reflective film comprises at least a portion of a communication band of the optical transmission medium; and
    an anti-reflective film located on one side of the optical transmission medium that faces the matching ferrule, wherein the anti-reflective film further covers at least a portion of the first surface of the ferrule matrix, wherein the second surface of the optical transmission medium protrudes from the first surface of the ferrule matrix and the reflective film covers a circumferential side surface of the optical transmission medium.

2. The ferrule of claim 1, wherein the second surface of the optical transmission medium includes an optical core area, and
    the reflective film includes a through hole and covers the second surface of the optical transmission medium, wherein an orthographic projection of the through hole of the reflective film onto the second surface of the optical transmission medium covers the optical core area.

3. The ferrule of claim 2, wherein the second surface of the optical transmission medium includes a main optical path area, and the orthographic projection of the through hole of the reflective film onto the second surface of the optical transmission medium covers the main optical path area.

4. The ferrule of claim 2, wherein an orthographic projection of the anti-reflective film onto the second surface of the optical transmission medium covers the orthographic projection of the through hole of the reflective film onto the second surface of the optical transmission medium, and an anti-reflective band of the anti-reflective film comprises at least a portion of a communication band of the optical transmission medium.

5. The ferrule of claim 4, wherein the anti-reflective film is located between the reflective film and the optical transmission medium.

6. The ferrule of claim 4, wherein the anti-reflective film is located in the through hole of the reflective film.

7. The ferrule of claim 6, wherein a surface of the anti-reflective film that faces the matching ferrule is recessed from a surface of the reflective film that faces the matching ferrule.

8. The ferrule of claim 1, wherein a filler is disposed in a gap between an inner wall of the accommodating through hole of the ferrule matrix and a circumferential side surface of the optical transmission medium; and
    the reflective film is disposed on one side of the filler that faces the matching ferrule, and is opposite to the filler.

9. The ferrule of claim 8, wherein an orthographic projection of the reflective film onto a reference plane covers an orthographic projection of the filler onto the reference plane, and the reference plane is vertical to an axial direction of the accommodating through hole of the ferrule matrix.

10. The ferrule of claim 8, wherein the second surface of the optical transmission medium is recessed from the first surface of the ferrule matrix, and the reflective film covers the inner wall of the accommodating through hole of the ferrule matrix.

11. The ferrule of claim 8, wherein the second surface of the optical transmission medium is aligned with the first surface of the ferrule matrix, and the reflective film covers the gap between the inner wall of the accommodating through hole of the ferrule matrix and the circumferential side surface of the optical transmission medium.

12. A connector, comprising:
    a housing; and
    a ferrule disposed within the housing, wherein the ferrule comprises:
        a ferrule matrix including an accommodating through hole, wherein one end of the accommodating through hole is located on a first surface of the ferrule matrix that faces a matching ferrule of the ferrule matrix,
        an optical transmission medium including a second surface that faces the matching ferrule, wherein the second surface of the optical transmission medium is an optical transmission surface, and the optical transmission medium is disposed in the accommodating through hole,
        a reflective film covering the first surface of the ferrule matrix, wherein a reflective band of the reflective film comprises at least a portion of a communication band of the optical transmission medium, and
        an anti-reflective film located on one side of the optical transmission medium that faces the matching ferrule, wherein the anti-reflective film further covers at least a portion of the first surface of the ferrule matrix, wherein the second surface of the optical transmission medium protrudes from the first surface of the ferrule matrix and the reflective film covers a circumferential side surface of the optical transmission medium.

13. The connector of claim 12, wherein the second surface of the optical transmission medium includes an optical core area, and
    the reflective film includes a through hole and covers the second surface of the optical transmission medium, wherein an orthographic projection of the through hole of the reflective film onto the second surface of the optical transmission medium covers the optical core area.

14. The connector of claim 13, wherein the second surface of the optical transmission medium includes a main optical path area, and the orthographic projection of the through hole of the reflective film onto the second surface of the optical transmission medium covers the main optical path area.

15. The connector of claim 13, wherein an orthographic projection of the anti-reflective film onto the second surface of the optical transmission medium covers the orthographic projection of the through hole of the reflective film onto the second surface of the optical transmission medium, and an anti-reflective band of the anti-reflective film comprises at least a portion of a communication band of the optical transmission medium.

16. The connector of claim 15, wherein the anti-reflective film is located between the reflective film and the optical transmission medium.

17. The connector of claim 15, wherein the anti-reflective film is located in the through hole of the reflective film.

18. The connector of claim 17, wherein a surface of the anti-reflective film that faces the matching ferrule is recessed from a surface of the reflective film that faces the matching ferrule.

19. The connector of claim 12, wherein a filler is disposed in a gap between an inner wall of the accommodating through hole of the ferrule matrix and a circumferential side surface of the optical transmission medium; and the reflective film is disposed on one side of the filler that faces the matching ferrule, and is opposite to the filler.

20. The connector of claim 19, wherein an orthographic projection of the reflective film onto a reference plane covers an orthographic projection of the filler onto the reference plane, and the reference plane is vertical to an axial direction of the accommodating through hole of the ferrule matrix.

* * * * *